3,238,221
TETRAAZAPORPHINE DYESTUFFS
Peter Schmitz, Cologne-Stammheim, and Detlef Delfs, Opladen, Germany, assignors to Farbenfabriken Bayer Aktiengesellschaft, Leverkusen, Germany, a corporation of Germany
No Drawing. Filed June 5, 1961, Ser. No. 114,619
Claims priority, application Germany, June 11, 1960, F 31,440
3 Claims. (Cl. 260—314.5)

The invention relates to new tetraazaporphine dyestuffs; more particularly it relates to tetrazaporphine dyestuffs of the general formula $$A \left( X-N-Ar-Y \atop R \right)_n \quad (I)$$

In this general formula A represents the residue of a tetraazaporphine dyestuff, in particular of a phthalocyanine dyestuff which may be free of metal or which may contain metal atoms, X stands for —$CH_2$—, —$SO_2$— or —CO—, R means hydrogen, a lower alkyl or hydroxy substituted lower alkyl radical, Ar represents a residue of the benzene, diphenyl, diphenylamine, diphenyloxide or naphthalene series and Y stands for an optionally substituted sulfonamido or sulfonylamino group, n stands for an integer from 1 to 8.

A particularly valuable class of dyestuffs among the compounds of the Formula I are those in which the sulfonamido group Y corresponds to the general formula $$-SO_2-NH-R_1-OSO_3Z \quad (II)$$
or
$$-SO_2-N-R_3-R_4-R_5-OSO_3Z \atop R_2 \quad (III)$$

wherein $R_1$ means an alkylene bridge having 2 or 3 carbon atoms between —NH— and —$OSO_3Z$, Z is hydrogen or an alkali metal cation, $R_2$ is a lower alkyl group, $R_3$ represents an alkylene group having 2 to 3 carbon atoms between $$-N- \atop R_2$$

and —$R_4$—, $R_4$ stands for —O—, —S— or $$-N-R_6$$

$R_6$ being hydrogen, $R_5$—$OSO_3Z$ or a lower alkyl group and $R_5$ is a lower alkylene group having 2 to 3 carbon atoms between —$R_4$— and —$OSO_3Z$. It is to be understood that the residue Ar contains at least one substituent Y; it may also bear more than one of those sulfonamido or sulfonylamino groups.

It is an object of the present invention to provide new variable dyestuffs. Another object is the provision of new dyestuffs which carry the substituents II or III, being able to undergo chemical linkage with hydroxyl group-containing materials, particularly cellulose-containing textile materials. Still another object is the provision of dyestuffs which possess highly valuable fastness properties. It is also an object of the invention to provide dyeings on cellulose-containing materials which, when dyed with the dyestuffs carrying substituents of the Formulae II and III, exhibit excellent fastness to wet processing, such as to washing.

The new dyestuffs are obtainable by reacting phthalocyanine sulfonic acid chlorides or -carboxylic acid chlorides or chloromethyl compounds of phthalocyanines with aryl-sulfonamides or sulfonylaminoaryl compounds, containing a primary or secondary amino group, the aryl compounds belonging to the afore-mentioned series.

Aryl sulfonamides suitable for the production of the dyestuffs of Formula I are, for example, the following:

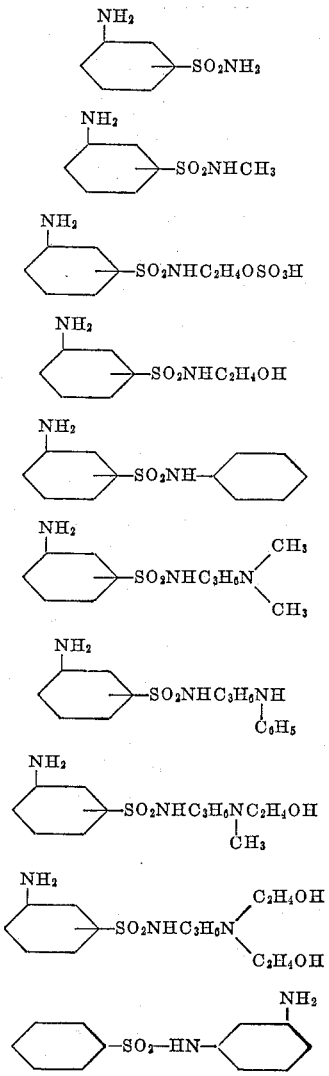

In these aniline sulfonamides the sulfonamide group may stand in o- and preferably in the m- or p-position to the amino group. Among naphthylamine derivatives the following are to be mentioned:

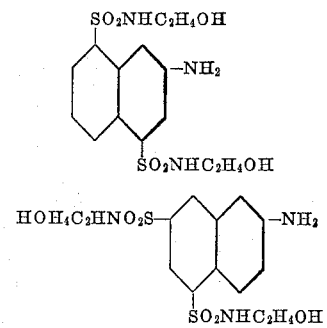

The aforesaid sulfonamide components may contain further substituents such as halogen, nitro, alkyl, alkoxy, sulfonamide, sulfone, carbonamide, free sulfonic acid and carboxylic acid groups, and others.

Starting phthalocyanines which may be sulfochlorinated are metal-free as well as metal-containing phthalocyanines of which there may be mentioned, for example, copper-, nickel-, cobalt-phthalocyanine, tetraphenyl-copper-phthalocyanine, 5,5',5'',5'''-tetraphenyl-3,3',3'',3'''-tetramethyl-4,4',4'',4''' - tetraaza-copper-phthalocyanine, tetrachloro-copper-phthalocyanine and other substitution products of phthalocyanines; further starting components are copper phthalocyanine - 4-tetrasulfonic acid, copper phthalocyanine-3-tri-sulfonic acid, nickel phthalocyanine-3-disulfonic acid, cobalt phthalocyanine-3-tri or -tetra-sulfonic acid, tetraphenyl-copper phthalocyanine-tetrasulfonic acid or -tetracarboxylic acid, nickel and copper mixed complexes from 2 or 3 mols of phthalic acid (or its dinitrile or 1-amino-3-imino-isoindolenine) and 2 or 1 mol of pyridine-2,3-dicarboxylic acid (or -dinitrile), dimethyl maleic acid dinitrile, 1,2-dicyano-3,6-dithiacyclohexene-1- or 1-phenyl-3,5-diamino-triazole (1,2,4); in these phthalocyanines sulfonic acid and carboxylic acid groups can be converted into the corresponding acid halide group by methods known as such, e.g., by reaction with chlorosulfuric acid/thionylchloride. Known chloromethyl phthalocyanines are to be employed for producing the dyestuffs of Formula I wherein X stands for —$CH_2$—.

The new dyestuffs can also be obtained by varied methods. Thus, for example, phthalocyanine-sulfonic acid or -carboxylic acid chlorides may be reacted with primary or secondary aromatic amines of the aforesaid series such as aniline, o-, m- or p-toluidine, chloraniline, N-methylaniline, N-hydroxyethylaniline, o-anisidine, aminodimethylbenzene, N-cyanethylaniline, amino-diethylbenzene, 1- or 2-aminonaphthalene, 4-aminodiphenyl, 4-aminodiphenylmethane, diphenylamine and the like, these sulfonic acid or carboxylic acid arylides then sulfo-chlorinated in the arylide radicals with, for example, chloro-sulfonic acid/thionylchloride, and the sulfochlorides then reacted with optional primary or secondary amines of the aliphatic, araliphatic or aromatic series.

For the last-mentioned processes, there are to be considered as amines among others: ammonia, methylamine, ethylamine, propylamine, butylamine, n-hexylamine, isohexylamine, dodecylamine, stearylamine, N-methyl-stearylamine, dimethylamine, amines from first runnings of fatty acids, di-(2-ethyl-n-hexyl)-amine, ethanolamine, N-methyl-ethanolamine, diethanolamine, propanolamine, 2-hydroxy-butylamine, β-aminoethylsulfate, γ-aminopropylsulfate, 3- or 4-aminobenzene-1-sulfonic acid-hydroxyethylamine or -1-sulfonylaminoethyl-hydrogensulfate, 3- or 4 - aminobenzene-1-(β-hydroxyethyl)-sulfone, benzylamine, N-methyl-benzylamine, cyclohexylamine, dicyclohexylamine, N-methyl-N-hydroxy-ethyl - propylene - diamine-(1,3), N,N-dihydroxyethyl - propylene - diamine-(1,3), N,N-dimethyl-propylene-diamine-(1,3), N-phenyl-propylenediamine-(1,3), N-hydroxy-ethyl-ethylenediamine, N,N- or N,N'-dihydroxyethyl-ethylenediamine, piperazine, N-hydroxyethyl-piperazine and the sulfates of the aforementioned hydroxyalkylamines, morpholine, thiomorpholine, pyrrolidine, m- or p-sulfanilic acid.

According to another modification phthalocyanine-sulfonic acid or -carboxylic acid chlorides may be reacted, instead of with aromatic amines, with aminoaryl-sulfonic acids such as m- and p-sulfanilic acid, 2-anisidine-4-sulphonic acid, 4-amino-1-methyl-2-sulfonic acid, 2-aminonaphthalene-4,8- or -5,7-disulfonic acid and the like, and the sulfonic acid groups converted by known methods into sulfonic acid chloride groups which can then be condensed with the aliphatic, araliphatic and aromatic primary and secondary amines described above.

In a similar manner, chloromethyl compounds of phthalocyanines may be condensed with arylamines or aminoarylsulfonic acids and the reaction products converted into dyestuffs according to the invention.

If the final dyestuffs are to contain free sulfonic acid groups, for example, phthalocyanine-bis- or -poly-sulfonic acid chlorides can be reacted with amines of the desired type with partial saponification of acid halide groups. On the other hand, phthalocyanine sulfonic acid chlorides may be reacted with sulfonic acid or carboxylic acid group-containing amine components of the aromatic or aliphatic series.

The new dyestuffs are highly valuable compounds which are suitable, inter alia, for the dyeing and printing of cotton and regenerated cellulose. If the dyestuffs contain groupings which may react with hydroxyl group- or polyamide group-containing materials with the formation of chemical linkage, such as sulfonic acid-hydroxyalkylamide-sulfuric acid semi-ester groups, haloalkylamino or haloacylamino groups, mono- or dichlorotriazinyl or -pyrimidinyl groups, epoxide groups, sulfofluoride groups, esterified hydroxyalkyl-sulfone groups and the like, the products are preferably used in an aqueous solution which may be treated with alkaline reactive substances such as alkali metal hydroxide or alkali metal carbonate, or with compounds convertible into substances of alkaline reaction, such as alkali metal bicarbonate. Further assistants may be added to the solution which, however, should not react with the dyestuffs in an undesirable manner. Such additives are, for example, surface-active substances such as alkyl sulfates, or substances preventing migration of the dyestuff, or dyeing auxiliaries such as urea or inert thickeners such as oil-in-water emulsions, tragacanth, starch, alginate or methyl-cellulose.

The solutions or pastes thus prepared are applied to the material to be dyed, for example by padding in the foulard or by printing, and subsequently heated for some time to an elevated temperature, preferably to 40–150° C. Heating may be carried out in the hot flue, in a steaming apparatus, on heated rollers or by introduction into heated concentrated salt baths, singly as well as consecutively in any desired order.

If a padding or dyeing liquor is used without alkali, the dry material is subsequently passed through an alkaline solution to which common salt or Glauber salt is added. The addition of salt prevents the migration of the dyestuff from the fibre.

After fixation, the dyeing material is rinsed hot and, if the purpose for which the dyed material is to be applied requires, subsequently soaped, insufficiently fixed dyestuff particles thus being removed. Dyeings of excellent fastness to wetting are thus obtained.

For printing hydroxyl group-containing materials, a printing paste is used which is prepared from the dyestuff solution, a thickener such as sodium alginate, and a compound of alkaline reaction or splitting off alkali upon heating such as sodium carbonate, potassium carbonate or sodium bicarbonate, the printed material is then rinsed and, if necessary, finally soaped.

Wool, silk and synthetic polyamide and polyurethane materials such as fibres, filaments, yarns, etc., are preferably dyed from a neutral to acid bath. The dyeing may be followed by a short alkaline treatment at, e.g., pH 6.5 to 8 thus improving the wet fastness properties. Dyeings with very good fastness properties are obtained on those materials.

The following examples are given for the purpose of illustrating the invention without, however, restricting it thereto.

*Example 1*

(a) 1.45 mol of tetraphenyl-copper phthalocyanine are introduced at 40–60° C. into 3550 ml. of chlorosulphonic acid. The mixture is after-stirred for 2–3 hours at 60° C., until a sample poured onto ice clearly dissolves in 10% aqueous pyridine, and to the red-brown solution 905 ml. of thionyl chloride are then slowly added dropwise at 60° C. The mixture is after-stirred for 1–2 hours. The completion of the reaction is recognisable by the fact that a further addition of thionyl chloride gives no longer rise to the evolution of gas. The product is allowed to cool, the melt is then poured onto ice, filtered and the residue washed with ice-water until neutral to Congo.

(b) A dyestuff tetrasulphochloride thus prepared is introduced at 10–20° C. into a solution of 9.5 mols of 3- or 4-aminobenzene-1-sulphonylaminoethyl-hydrogen sulphate in 36 litres of water adjusted to pH 9–9.5. After termination of the introduction, the temperature is raised to 35–40° C. and the pH value kept constant by the dropwise addition of 600 ml. of concentrated sodium hydroxide solution (or a corresponding amount of sodium carbonate). As soon as the pH value no longer changes, the product is filtered and washed with a little water, until the initially colourless filtrate acquires a slightly green colour. The product is dried at 50–55° C. under vacuum.

(c) By condensation with 2-aminonaphthalene-4,8- (or -5,7-)-bis-(sulphonyl - aminoethyl - hydrogensulphate), a dyestuff of similar properties is obtained.

(d) 0.2 g. of a dyestuff produced according to (b) or (c) is dissolved in 10 ml. of an aqueous solution containing 100 g. of urea, 25 ml. of concentrated sodium hydroxide solution and 5 g. of Turkish red oil per litre, and applied to calico. The material is dried for 10 minutes at 120–140° C. and then boiled with soap. A bluish green dyeing of very good fastness to light, boiling and solvents is thus obtained.

(e) 40 g. of a dyestuff ester produced according to (b) or (c) are dissolved in 100 g. of urea, 40 g. of sodium hydroxide solution (38° Bé.) and 320 ml. of water and stirred into 500 g. of a conventional alginate thickening. Such a printing paste is printed by known methods on calico or staple fibre, the material dried intermediately at 60–80° C. and steamed in dry steam at 103–105° C. for 8 minutes. After soaping, green prints are obtained which are fast to boiling and to solvents.

Example 2

(a) A dyestuff tetrasulphochloride produced according to Example 1 (a) is introduced at 10–20° C. into a solution of 9.5 mols of 3- or 4-aminobenzene-1-sulphonic acid hydroxyethylamide in 36 litres of water adjusted to pH 9–9.5. The temperature is raised to 40° C. and the pH value kept constant by the addition of sodium carbonate and sodium hydroxide solution. After termination of the reaction, the product is filtered and dried at 70–75° C. under vacuum.

The dried dyestuff is introduced at 15–25° C. into the threefold volume of sulphuric acid-monohydrate. The mixture is after-stirred, until the whole has dissolved, the melt is then poured onto ice and pressed off. The product is then washed with water until neutral and the green dyestuff ester is dried at 50–55° C. In the same manner, 2-aminonaphthalene-4,2- (or -5,7)-bis-(sulphonic acid-hydroxyethylamide) can be used for condensation with the phthalocyaninesulphochloride.

The dyestuffs thus obtained can be applied to hydroxyl group-containing materials and fixed fast to wetting according to Examples 1 (d) or (e).

Example 3

(a) 1/20 mol of a dyestuff sulphochloride produced according to Example 1 (a) is introduced at 10–15° C. into 250 ml. of aniline. The temperature is raised to 60° C., this temperature is maintained for 2 hours, and the excess aniline is driven off with steam. The crystalline green residue is filtered off with suction, washed with warm water and dried at 70° C.

(b) The dried dyestuff sulphonic acid anilide is then introduced at 35–45° C. into 200 ml. of chlorosulphonic acid. The mixture is after-stirred at this temperature for 3 hours, 50 ml. of thionyl chloride are then added dropwise and the material is after-stirred for 2 hours. After cooling, the product is poured onto ice, pressed off and the dyestuff sulphochloride washed with ice-water until neutral to Congo.

(c) The product is then introduced into a solution of 56 g. of β-aminoethyl-sulphate (=aminoethanol-sulphuric acid semi-ester) in 600 ml. of water and 11 ml. of concentrated sodium hydroxide solution. The mixture is slowly heated to 35–40° C. and the pH value kept at 9–9.5 by the simultaneous addition of 30 ml. of concentrated sodium hydroxide solution. After completion of the reaction (as soon as the pH value no longer decreases) the product is filtered off with suction and the green dyestuff ester dried at 55° C.

The product can be applied to cotton according to Examples 1 (d) or (e) and yields blue-green dyeings and prints of very good fastness to light and boiling.

(d) A dyestuff sulphonic acid chloride produced according to (b) is introduced at 0–5° C. into a solution of 24 g. of aminoethanol in 240 ml. of ice-water. The temperature should slowly rise to 25° C. The product is then heated to 60° C., kept at this temperature for 2 hours and filtered off with suction while hot. The product is washed with warm water until neutral and dried at 70° C.

(e) The dried dyestuff sulphonic acid hydroxyethylamide is introduced into 3 parts by volume of sulphuric acid monohydrate. As soon as a clear melt is formed, it is poured onto ice, filtered off with suction and washed with a common salt solution until neutral. The green dyestuff ester conforms in its dyeing properties with the product obtained according to (c).

Example 4

When using in Example 3, instead of aniline, other aromatic amines such as N-methylaniline, o-toluidine, p-toluidine, m-toluidine, o-chloraniline, p-chloraniline, o-anisidine or N-(β-hydroxyethyl)-aniline, the methods according to Examples 3 (b) and (d) lead likewise to valuable products which can be fixed fast to wetting on cotton and regenerated cellulose.

Example 5

When using in Example 3 (d), instead of aminoethanol, the following amines, valuable dyestuffs are likewise obtained: ammonia, methylamine, ethylamine, propylamine, butylamine, dimethylamine, propanolamine, 2-hydroxybutylamine, diethanolamine, N,N-dimethyl-propylenediamine-1,3, N-phenyl-propylenediamine-1,3, N-methyl-N-hydroxyethyl-propylenediamine-1,3, N,N-dihydroxyethyl-propylenediamine-1,3, N - hydroxyethyl-ethylenediamine, N,N'-dihydroxyethyl-ethylenediamine, aniline, o-, m- or p-toluidine, o-anisidine, N-(β-hydroxyethyl)-aniline, 3- or 4-aminobenzene-1-sulphonic acid hydroxyethylamide or -1-sulphonylamino-ethyl-hydrogensulphate, 3- or 4-aminobenzene-1-(β-hydroxyethyl)-sulphone.

Example 6

When the sulphochlorination of tetraphenyl-copper phthalocyanine in Example 1 (a) is carried out at 140° C., a yellowish green octa-sulphochloride is obtained which can be reacted in an analogous manner to the described processes.

Example 7

A sulphochloride produced according to Example 1 (a) is condensed according to Example 2 (a) with 4-amino - 2-methyl-1-sulphonylaminoethyl-hydrogensulphate or 4-amino-2-methyl-1-sulphonic acid-hydroxyethylamide. Bluish green dyestuffs are thus obtained.

Example 8

(a) 14 mols of moist copper phthalocyanine-(CuPc)-3-trisulphochloride are introduced at 10–15° C. into 28 litres of aniline and after-stirred overnight. The mixture is then heated to 60° C. for 2 hours and the excess aniline driven off with steam. The reaction product becomes initially viscous and with progressive removal of aniline well crystalline. The product is filtered off with suction, washed with hot water and dried at 65° C. The aniline is separated from the water and about 20 litres of aniline are recovered without working up the portions remaining in the water.

(b) A dry CuPc-3-trisulphonic acid anilide produced according to (a) is introduced at 15–30° C. into 29.34 litres of chlorosulphonic acid and kept at 35° C. for 3 hours. A sample poured onto ice must be completely soluble in 10% aqueous pyridine. At the same temperature, 6.3 litres of thionyl chloride are then added dropwise. The mixture is after-stirred for 2 hours, the melt poured onto ice and washed with ice-water until neutral to Congo. The reaction leads to a mixture of copper-phthalocyanine-trisulfonic acid anilide sulfochlorinated in p- or o-position of the anilide residue.

(c) One-half of the moist sulphochloride thus prepared is introduced into 2.52 kg. of ethanolamine, 12.6 litres of water and 12.6 kg. of ice. The mixture is after-stirred overnight, heated to 60° C. for 2 hours and the pH value adjusted to 8.5 with dilute hydrochloric acid. The product is then filtered off with suction while hot and the dyestuff sulphonic acid hydroxyethylamide washed with hot water until neutral. It is dried at 65–70° C. The product thus obtained is a mixture of copper-phthalocyanine - 3-tri-(p-β-hydroxyethylsulfonamidophenyl)-sulfonamide and the corresponding o-substitution product.

(d) A dry sulfonic acid-hydroxyethylamide obtained according to Example (c) is introduced unground at 15–25° C. into the threefold volume of sulfuric acid monohydrate. The mixture is stirred overnight, until the whole is dissolved and the melt then poured onto about 10 times its weight of ice, referred to parts by volume of sulfuric acid monohydrate. The product is then pressed off and the acid removed by washing with a 5% potassium chloride solution. A dyestuff ester thus prepared (mixture of p- and o-substitution product) can be applied to cotton or staple fibre according to Examples 1 (d) or (e). Blue prints and dyeings are thus obtained which are fast to light and very fast to boiling.

(e) The second half of the moist sulphochlorinated CuPc-3-trisulphonic acid anilide prepared according to (b) is introduced into a solution of 5.9 kg. of β-amino-ethyl sulphate in 59 kg. of ice-water and 1.29 litres of concentrated sodium hydroxide solution. A pH value of 9.2–9.5 is maintained by the addition of about 2.07 litres of concentrated sodium hydroxide solution. Condensation sets in only at 10–20° C. The mixture is initially heated to a temperature at which a marked consumption of alkali sets in. The reaction is completed after about 2 hours. The reaction solution becomes viscous at first, then again thinly liquid. The product is salted out by the addition of a concentrated potassium chloride solution and pressed off. The blue dyestuff ester (mixture of o- and p-substitution product) can be applied to cellulose in conventional manner.

(f) In a similar manner, copper phthalocyanine mono-, di- or tetrasulfochloride and CuPc-4-tetrasulfochloride may be converted according to the methods (a) to (e).

*Example 9*

(a) By using in Example 8, instead of CuPc-3-trisulfochloride, an equivalent amount of NiPc-3-tri-(or tetra)-sulfochloride, there is obtained in an appropriate reaction sequence a mixture of dyestuff esters in which the esterified hydroxyethylsulfonamide groups are in p- or o-position of the anilide residue, which dyes cotton in greenish blue shades of very good fastness to light and boiling.

With nickel phthalocyanine - 3 - tri- (or tetra)-sulphochloride with conversions described in Examples 1 to 7 may likewise be carried out.

When using cobalt phthalocyanine derivatives (sulphonic acids or sulphonic acid chlorides) in the preceding processes, dull blue dyeings and prints are obtained on hydroxyl group-containing textile materials.

The following phthalocyanines and phthalocyanine mixed complexes have been converted into valuable dyestuffs via their sulphochlorides or carboxylic acid chlorides according to the methods described above:

5,5′,5″,5‴ - tetraphenyl - 3,3′,3″,3‴-tetramethyl-4,4′,-4″, 4‴-tetraza-CuPc (yellowish green shades), tetra-chloro-copper phthalocyanine (green), tetraphenyl-copper phthalocyanine-tetrasulphonic acid, tetraphenyl-copper phthalocyanine-tetracarboxylic acid (both green), nickel and copper mixed complexes from 2–3 mols of phthalic acid (or its dinitrile or 1-amino-3-imino-isoindolenine) and 2 or 1 mol of pyridine-2,3-dicarboxylic acid (or -dinitrile) (blue), dimethyl-maleic acid dinitrile (grey), 1,2-dicyano-3,6-dithiacyclohexene-1 (greenish grey to blue-grey, in accordance with the mixing proportion and metal component), or 1-phenyl-3,5-diamino-triazole-(1,2,4) (brown shades).

*Example 10*

A tetrachloromethyl-copper phthalocyanine obtainable according to known methods is reacted with an excess of aniline and isolated according to Example 8 (a).

A sulfochlorinated CuPc-tetramethylaniline obtainable therefrom according to the process of Example 8 (b) can be worked up according to the methods 8 (c) to 8 (e) or also with the amines of Example 5. Valuable blue dyestuffs are obtained in this way.

*Example 11*

(a) A dyestuff of the formula

prepared according to the processes described above, is esterified with sulphuric acid monohydrate and applied to cotton and staple fibre according to Example 1 (d) or (e). Blue prints and dyeings are thus obtained which are fast to light and washing.

(b) 20 g. of a dyestuff produced according to (a) are dissolved in 100 g. of urea, 20 g. of sodium bicarbonate and 340 ml. of water and stirred into 500 g. of a conventional alginate thickening. Such a printing paste is printed by known methods on wool, silk and Perlon, the material dried intermediately at 60–80° C. and steamed in dry steam at 103–105° C. for 8 minutes. After soaping, blue prints are obtained which are fast to boiling and solvents.

*Example 12*

A sulfochlorinated copper phthalocyanine-3-tri-sulfonic-acid anilide obtained according to the method described in Example 8 (b) is reacted according to the method given in Example 8 (c) with excess aqueous solutions or suspensions of the following amines: ammonia, methylamine, dimethylamine, ethylamine, n-propylamine, n-butylamine, propanolamine, 2-hydroxybutylamine, di-ethanolamine, N,N-dimethyl-propylene-diamine-(1.3), N-methyl-N-hydroxyethyl-propylenediamine-(1.3), N,N-di-hydroxyethyl-propylenediamine-(1.3), N-isopropyl-propylenediamine-(1.3), N-isobutyl-propylenediamine-(1.3), N-cyclohexyl-propylenediamine-(1.3), N-hydroxyethyl-ethylenediamine, N,N′-dihydroxyethyl-ethylenediamine, aniline, N-methyl-cyclohexylamine, N-methylaniline, N-ethylaniline, diphenylamine, dicyclohexylamine, 4-amino-diphenyl, 4-aminodiphenylmethane, o-, m- or p-toluidine, m-chloroaniline, p-chloroaniline, N-(β-hydroxyethyl)-aniline, 3- or 4-aminobenzene-1-sulfonic acid hydroxy-ethylamide or -1-sulfonylamino-ethylhydrogen sulfate, 2-aminonaphthalene, 1-aminonaphthalene, 4-aminodiphenyleneoxide, 2-chloroethylamine, 2-ethylhexylamine, iso-hexylamine, dodecylamine, stearylamine, tetradecylamine, hexadecylamine, N-methyl-stearylamine, allylamine, di-allylamine, amino acetic acid, N-methyl-amino acetic acid, 4-amino butyric acid, 2-aminoethane sulfonic acid, 2-methylaminoethane sulfonic acid, di-(2-ethyl-n-hexyl-amine), 2-butylamino-ethane sulfonic acid, amines from first runnings of fatty acids, 3- or 4-aminobenzene-1-(β- hydroxyethyl)-sulfone, 3- or 4-aminobenzene-sulfonic acid-1, 2- or 3- or 4-aminobenzene-carboxylic acid-1, 2-amino benzoic acid-(1)-sulfonic acid-(4), 2-amino benzoic acid-(1)-sulfonic acid-(5), 2-methylamino benzoic acid-(1)-sulfonic acid-(4), 3-amino benzoic acid-(1)-sulfonic acid-(5), 2-phenylamino-benzoic acid, 4-aminobenzene sulfonic acid-(1)-amide, 2- or 3-aminobenzene sulfonic acid-(1)-(N-benzene-sulfonyl)-amide, benzylamine, N-methyl-benzylamine, cyclohexylamine, N-ethylcyclohexylamine, N-hydroxyethyl-aniline, β-phenyl-ethylamine, 4-aminotoluol-ω-sulfonic acid, 4-aminotoluol-sulfonic acid-(2), piperidine, piperazine, N-hydroxyethyl-piperazine, morpholine, thiomorpholine, pyrrolidine, N-benzene-sulfonyl-m-phenylenediamine, N-methyl-sulfonyl-m-phenylenediamine, N-ethylsulfonyl-m-phenylenediamine, N-4'-methylbenzene-sulfonyl-p-phenylenediamine, N-4'-chlorobenzene-sulfonyl-p-phenylenediamine, N-methyl-N - benzenesulfonyl - m - phenylenediamine, N-methyl-N-methylsulfonyl - m - phenylenediamine, N - methyl - N-4'-methylbenzenesulfonyl-m-phenylenediamine. One obtains valuable blue dyestuffs.

The dyestuffs which were obtained with the aforesaid primary/tertiary or primary/secondary amines are insoluble in water and soluble in dilute organic acids such as acetic acid and oxalic acid. They can be used for dyeing of paper blue shades fast to light; they are further suited for the preparation of blue ball pen pastes having good fastness to light.

The dyestuffs which correspond to the formulae

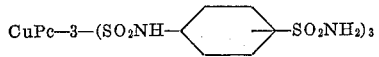

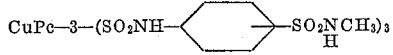

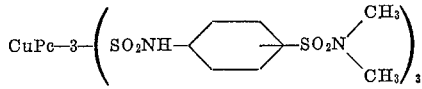

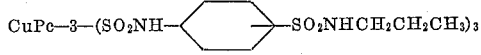

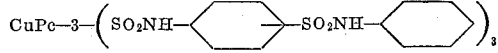

are mixtures of products wherein the phenylsulfonamide group occupies the p- or o-position of the phenyl nucleus of the middle phenylsulfonamide group. They were prepared from the above-said appropriate starting materials and dye cotton from soda to sodium alkaline aqueous solution at 80° C. brillant blue shades with very good fastness to light.

Example 13

A dyestuff obtained according to Example 12 and representing a mixture of p- and o-sulfonamido substituted copper phthalocyanine sulfophenylamides of the formula

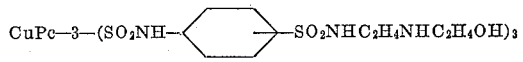

is treated with ClSO₃H/pyridine. The blue esterified dyestuff thus obtained can be applied according to the methods given in Examples 1 (d) and (e) on cotton and staple rayon. One obtains blue shades and prints of good fastness to boiling.

Example 14

100 g. of a dyestuff obtained according to Example 12 and representing a mixture of o- and p-sulfonamido substituted copper phthalocyanine-sulfophenylamides of the formula

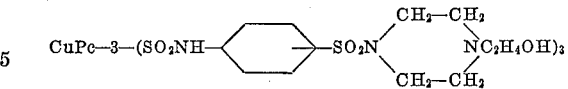

are introduced at 15 to 25° C. into 300 ml. of sulfuric acid monohydrate. After 4 hours the melt is poured onto ice, squeezed off and the filter residue washed acid-free with ice water. The dyestuff ester thus obtained dyes cotton and stretched cuprammonium rayon according to the prescription of Examples 1 (d) and (e) blue shades of good fastness to light and solvents.

Example 15

A dyestuff prepared according to the method given in Example 12 and representing a mixture of the o- and p-sulfonamido substitution product of the formula

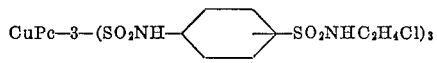

is heated in an autoclave with excess aqueous dimethylamine to 100 to 120° C. The reaction product corresponds to the probable formula

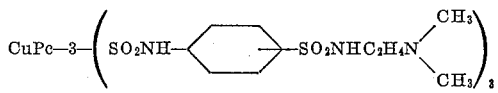

It dissolves in dilute acetic acid and dyes paper in blue shades fast to light.

Example 16

A water-insoluble dyestuff obtained according to Example 12 (mixture of the o- and p-sulfonamido substitution product of

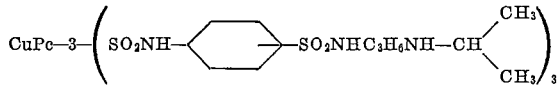

is treated with an aqueous suspension of 3 mols of acetic acid, a bluish solution thus being obtained. The solution is dried in vacuo. The dyestufl thus prepared corresponds to the formula

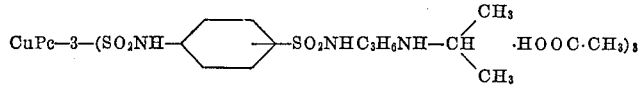

(mixture of the o- and p-substitution product)
It can be used for dyeing of paper. The free base is suited for the preparation of blue ball pen pastes.

Example 17

A water-insoluble dyestuff of the formula

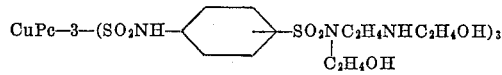

(mixture of the o- and p-substitution product obtained according to Example 12)
is esterified with sulfuric acid monohydrate according to Example 14. The dyestuff ester can be applied on cotton by pad-dyeing or printing yielding blue shades and prints of good light-fastness and fastness to soaping.

Example 18

1 mol of wet copper phthalocyanine-3-trisulfonic acid chloride is condensed with aniline according to the method indicated in Example 8 (a). The mixture is heated to 60° C. for 2 hours, the melt then allowed to cool down and poured into excess dilute hydrochloric acid. Upon this method the excess aniline dissolves in the form of its chlorohydrate whilst the blue copper phthalocyanine-3- trisulfonic acid anilide precipitates in crystalline form. It is filtered with suction and washed acid-free with water and then dried at 65° C. The trisulfonic acid anilide thus produced can be applied as intermediate for further sulfochlorination or sulfanilation.

*Example 19*

A sulfochlorinated copper phthalocyanine-3-trisulfonic acid anilide prepared according to Example 8 (b) is reacted, according to the method given in Example 8 (c) with 1 mol of ethanolamine in the presence of soda. After the condensation reaction is complete the mixture is justified by addition of soda-lye to pH 12 and remaining free sulfochloride groups saponified. The dyestuff thus obtained corresponds to the probable formula

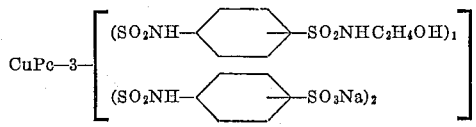

(mixture of p- and o-sulfonamido substitution product). After drying it is esterified with chlorosulfonic acid/pyridine. The dyestuff ester dyes cotton according to the prescriptions given in Examples 1 (d) and (e) blue shades being fast to solvents and to boiling.

*Example 20*

1 mol of copper phthalocyanine-3-trisulfonic acid chloride is condensed with 2 mols of 3- or 4-aminobenzene sulfonic acid hydroxyethylamide at pH 9.5 in presence of soda-lye. After the condensation has finished the pH is adjusted to 12 and the mixture heated to the boil. Upon boiling non-condensed sulfonic acid chloride groups are saponified. The dyestuff thus obtained corresponds to the formula

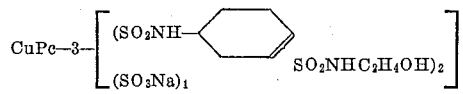

After drying it is esterified with sulfuric acid monohydrate. It yields on cotton blue dyeings and prints of excellent fastness to boiling.

*Example 21*

If using in Examples 12 to 17 instead of sulfochlorinated copper phthalocyanine-3-tri-sulfonic acid anilide the sulfochlorinated copper phthalocyanine-3-mono-, -di- or -tetrasulfonic acid anilide blue dyestuffs are obtained which possess valuable dyeing properties.

If the corresponding nickel or cobalt phthalocyanines are reacted, dyestuffs having similar fastness properties and shades are obtainable.

In equal manner the phthalocyanines and phthalocyanine mixed complexes described in Example 9 may be used and furthermore tetraphenyl-nickel-phthalocyanine and tetraphenyl - nickel - phthalocyanine - tetracarboxylic acid.

*Example 22*

Valuable dyestuffs and dyestuff intermediates are also obtained if in Example 8(a) instead of aniline the following amines are used and the reactions are carried out in an analogous manner as indicated in Example 18: 2-, 3- and 4-methylaniline, 2- and 4-chloroaniline, N-methylaniline, N-ethylaniline, N-(β-hydroxyethyl)-aniline, diphenylamine, 4-aminodiphenyl, 4-aminodiphenylmethane, 2 - aminonaphthalene, 1 - aminonaphthalene, 4 - aminodiphenylene oxide, 4-aminodiphenylsulfide, N-phenyl-cyclohexylamine, benzylamine, 3- or 4-aminobenzene sulfonic acid-1, 2- or 3- or 4-aminobenzene carboxylic acid-1, 2- aminobenzoic acid-(1)-sulfonic acid-4 (or -5), 2-methyl-aminobenzoic acid-(1)-sulfonic acid-(4), 3-aminobenzoic acid-(1) - sulfonic acid - (5), 2-phenylaminobenzoic acid, 4-aminotoluol-ω-sulfonic acid, N-methyl-benzylamine, β-phenyl-ethylamine, 4 - aminotoluol - sulfonic acid-(2), 4- chlorobenzene-sulfonic acid-1, 3-chlorobenzene - sulfonic acid-1, 2-aminonaphthalene-4,8-disulfonic acid, 2-aminonaphthalene-5,7-disulfonic acid, 5-aminobenzene - 1,3-disulfonic acid.

The aforementioned amines can be condensed with the phthalocyanine starting materials according to the method indicated in Example 8(b) or, in case they already contain SO₃H— or COOH— groups, be condensed with the acetylide group-containing starting materials, then again converted into acid halides by means of SOCl₂ or POCl₃/PCl₅, optionally in the presence of organic diluents such as chlorobenzene and the then obtained acid chloride groups again condensed with amines according to Examples 8(c) and (e).

*Example 23*

A dyestuff obtained according to Example 22 corresponding to the formula

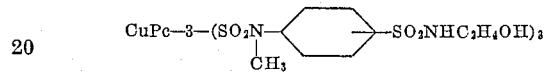

(mixture of o- and p-sulfonamido substituted compounds) is esterified with sulfuric acid monohydrate. It can be padded or printed onto cotton according to Examples 1 (d) and (e). One obtains blue shades of very good fastness to boiling and to solvents.

*Example 24*

If in Example 10 instead of aniline the amines indicated in Example 22 are employed valuable blue copper phthalocyanine tetramethylamino compounds are obtainable which can be converted into sulfonic acid chlorides and then condensed with the amines mentioned in Example 12. The dyestuffs thus prepared may be depending on the constitution used as reactive dyestuffs or for dyeing paper or for the preparation of ball pen pastes or as dyestuffs for coloring lacquers.

*Example 25*

A dyestuff obtained according to Example 24 corresponding to the formula

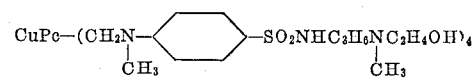

is esterified with sulfuric acid. The dyestuff ester dyes cotton according to the method given in Examples 1(d) and (e) blue shades fast to boiling.

*Example 26*

(a) 150 g. of 5,5′,5″,5‴-tetraphenyl-copper-phthalocyanine-4,4′,4″,4‴-tetracarboxylic acid are introduced at 40 to 60° C. into 450 ml. of chlorosulfonic acid. The reaction mixture is warmed to 60° C. for two hours and then treated dropwise with 180 ml. of thionylchloride and finally stirred for two hours at 60° C. The cold melt is poured onto ice, the green acid chloride filtered with suction and washed with ice-water until congo-neutral reaction.

(b) ⅓ of the acid chloride obtained according to paragraph (a) is introduced into a solution (pH 9.5) of 28 g. of aminoethylsulfate (about 4 molecular equivalents) in 200 ml. of ice-water and 7 ml. of concentrated soda-lye. The mixture is heated to 35 to 40° C. and the pH value kept constant by simultaneous dropwise addition of soda-lye. When the pH no longer decreased the condensation product is filtered with suction without the addition of salt and washed with water. The dyestuff ester thus obtained can be applied onto cotton and staple rayon according to the methods given in Examples 1(d) and (e) with about 100 percent fixation, green shades of good fastness to light and washing thus being obtained.

(c) If in paragraph (b) instead of 28 g. of aminoethylsulfate 0.2 mols of 3-aminobenzene-1-sulfonylamino-ethyl-hydrogensulfate (about 4 molecular equivalents) are used, a green dyestuff solution can be obtained from which the dyestuff ester can be precipitated by adding sodium or potassium chloride. The dyestuff yields on hydroxy group-containing textile materials such as cotton and regenerated cellulose green shades of very good fastness to light and to washing.

(d) ⅓ of the sulfochloride obtained according to the method indicated in paragraph (a) is introduced at 0 to 5° C. into a solution of 32 g. of N,N'-dihydroxyethyl-propylenediamine-(1.3) in 300 ml. of ice-water. The reaction mixture is warmed to 60° C. within two hours while keeping the pH-value at 9 to 9.5 by the addition of dilute soda-lye or sodium carbonate solution. It is then further stirred for two hours at 60° C., the dyestuff base filtered with suction and washed neutral with water. The product is dried at 70° C.

The dry dyestuff base is dissolved at 15 to 25° C. in 5 parts by volume of sulfuric acid monohydrate and poured onto ice after stirring for 5 hours. The green dyestuff ester precipitates. It is filtered with suction, washed neutral with a 3 percent sodium chloride solution and dried in vacuo at 50° C. The dyestuff can be fixed onto cotton and regenerated cellulose with quantitative yield and brilliant green shades and prints being fast to light.

Example 27

(a) 100 g. of 5,5',5'',5'''-tetraphenyl-copper-phthalocyanine-4,4',4'',4'''-tetracarboxylic acid are finely milled and introduced at 0 to 10° C. into 300 ml. of thionylchloride and 10 ml. of dimethylformamide. The reaction mixture is slowly warmed to 70 to 75° C. and kept at this temperature for 3 to 4 hours. Excess thionylchloride is distilled off from the green solution thus obtained. One obtains a well crystallized green dyestuff tetracarboxylic acid chloride.

(b) One-half of the dyestuff carboxylic acid chloride obtained according to paragraph (a) is introduced at 0 to 5° C. into a solution of 0.4 mol of 3-aminobenzene-1-sulfonic acid hydroxyethylamide in 500 ml. of acetone. One slowly rises the temperature to 60° C. and stirs for 3 hours. Over this time interval the pH is kept at 9 by dropwise addition of soda-lye. The reaction mixture is then diluted with water and the dyestuff base of the probable formula

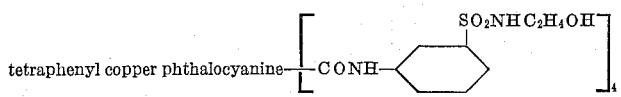

filtered with suction. It is washed with water and dried at 70° C.

The dry dyestuff base is now esterified at 15 to 25° C. with 8 to 10 times the weight of sulfuric acid monohydrate, referred to the weight of the dyestuff to be esterified. After usual working up according to the method of Example 26 (d) one obtains a dyestuff ester which dyes cotton according to Examples 1 (d) and (e) in quantitative yield and bluish green shades of very good fastness to light.

(c) If in paragraph (b) instead of 3-aminobenzene-1-sulfonic acid hydroxyethylamide the corresponding sulfuric acid ester of the formula

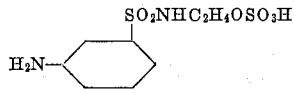

is used one obtains in only one reaction step the green dyestuff ester finally obtainable by the method under (b):

Example 28

Copper phthalocyanine-3-tri-sulfonic acid chloride is condensed according to the reaction method described in Example 2 with about equivalent amounts of the following amines: 4-aminobenzene-sulfonic acid-(1)-amide, 2- or 3-aminobenzene-sulfonic acid - (1) - (N - benzenesulfonyl) - amide, N-benzenesulfonyl-m-phenylenediamine, N-methylsulfonyl-m-phenylenediamine, N - ethylsulfonyl-m - phenylenediamine, N - 4' - methylbenzenesulfonyl-p-phenylenediamine, N-4'-chlorobenzenesulfonyl-p-phenylenediamine, N-methyl-N-benzenesulfonyl-m-phenylenediamine, N-methyl-N-methylsulfonyl-m-phenylenediamine, N - methyl - N-4' - methylbenzensulfonyl-m-phenylenediamine. One obtains valuable blue dyestuffs of non-reactive character which may be used for purposes indicated in the preceding examples.

Example 29

0.5 mol of sulfochlorinated copper phthalocyanine-3-tri-sulfonic acid anilide are added with cooling to 200 g. of a primary amine from ketones of coco acid first runnings and 100 ml. of methanol. The reaction mixture is warmed to 50 to 60° C. within one hour, stirred for one further hour and then filtered with suction. The dyestuff thus obtained is a mixture of copper phthalocyanine dyestuffs of the probable formula

(o- and p-substitution product).

It is soluble in benzene, acetic ester and ethyl alcohol and therefore suitable as dyestuff for lacquerings.

We claim:

1. A dyestuff of the formula

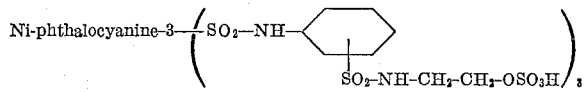

in which the sulfonamido ring substituent is selected from the group consisting of an ortho positioned substituent and a para positioned substituent.

2. A dyestuff of the formula

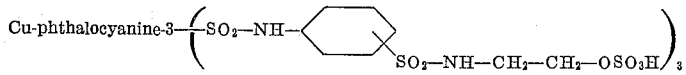

in which the sulfonamido ring substituent is selected from the group consisting of an ortho positioned substituent and a para positioned substituent.

3. A dyestuff which in the free acid state is of the formula

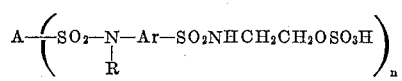

wherein A stands for metal phthalocyanine selected from the class consisting of copper phthalocyanine and nickel phthalocyanine; R stands for a member selected from the group consisting of hydrogen, lower alkyl and hydroxy substituted lower alkyl; Ar stands for a member selected from the group consisting of phenylene, diphenylene, and naphthylene; and $n$ stands for a whole number within the range of about 1–8.

References Cited by the Examiner
UNITED STATES PATENTS

| | | | |
|---|---|---|---|
| 2,795,583 | 6/1957 | Martin et al. | 260—314.5 |
| 2,935,506 | 5/1960 | Heslop et al. | 260—314.5 |
| 2,995,412 | 8/1961 | Kleb | 260—314.5 |
| 3,029,123 | 4/1962 | Putter et al. | 260—163 |
| 3,062,830 | 11/1962 | Buc et al. | 260—314.5 |
| 3,066,005 | 11/1962 | Wedemeyer et al. | 260—314.5 |

WALTER A. MODANCE, *Primary Examiner.*

IRVING MARCUS, NICHOLAS S. RIZZO, *Examiners.*